United States Patent [19]

White

[11] Patent Number: 4,489,625
[45] Date of Patent: Dec. 25, 1984

[54] SPLIT TORQUE TRANSMISSION

[75] Inventor: Graham White, Chesterland, Ohio

[73] Assignee: Transmission Research, Inc., Cleveland, Ohio

[21] Appl. No.: 443,994

[22] Filed: Nov. 23, 1982

[51] Int. Cl.³ .............................................. F16H 37/06
[52] U.S. Cl. ................. 74/665 C; 74/665 B; 74/665 N; 74/665 M; 74/675
[58] Field of Search ............ 74/665 A, 665 B, 665 C, 74/665 L, 665 M, 665 N, 665 P, 674, 675, 661; 244/60

[56] References Cited

U.S. PATENT DOCUMENTS

| | | | |
|---|---|---|---|
| 2,770,149 | 11/1956 | Losey | 74/675 X |
| 3,564,937 | 2/1971 | Solovier et al. | 74/665 A |
| 3,602,068 | 8/1971 | White | 74/674 |
| 3,757,912 | 9/1973 | Ball | 192/0.02 |
| 3,782,223 | 1/1974 | Watson | 74/665 L |
| 3,871,248 | 3/1975 | Barish | 74/665 P |
| 3,905,250 | 9/1975 | Sigg | 74/665 B |
| 3,977,632 | 8/1976 | Watson | 244/60 |

FOREIGN PATENT DOCUMENTS

| | | |
|---|---|---|
| 619028 | 4/1961 | Canada . |
| 13792 | 8/1956 | Fed. Rep. of Germany . |
| 2211618 | 9/1973 | Fed. Rep. of Germany .... 74/665 C |
| 940024 | 10/1963 | United Kingdom . |
| 1107654 | 3/1968 | United Kingdom . |

Primary Examiner—Allan D. Herrmann
Assistant Examiner—Wright
Attorney, Agent, or Firm—Hill, Van Santen, Steadman & Simpson

[57] ABSTRACT

A split-torque transmission in which a high-speed engine drives a substantially lower speed drive shaft, such as a helicopter rotor drive shaft, comprises a pair of selectively laterally inclined cross shafts for drivingly connecting a corresponding pair of helicopter engines with the helicopter rotor drive shaft. The transmission arrangement achieves a relatively high overall speed reduction, such as required in the transmission of power to the main rotor of a helicopter, with a minimum number of reduction stages, gears, and bearings. The lateral inclination of the cross shafts and the adjustable positioning of the associated gears to vary that inclination permits the engines of a two or more engined helicopter to be relatively widely separated and at the same time compact the drive arrangement in the longitudinal direction.

16 Claims, 8 Drawing Figures

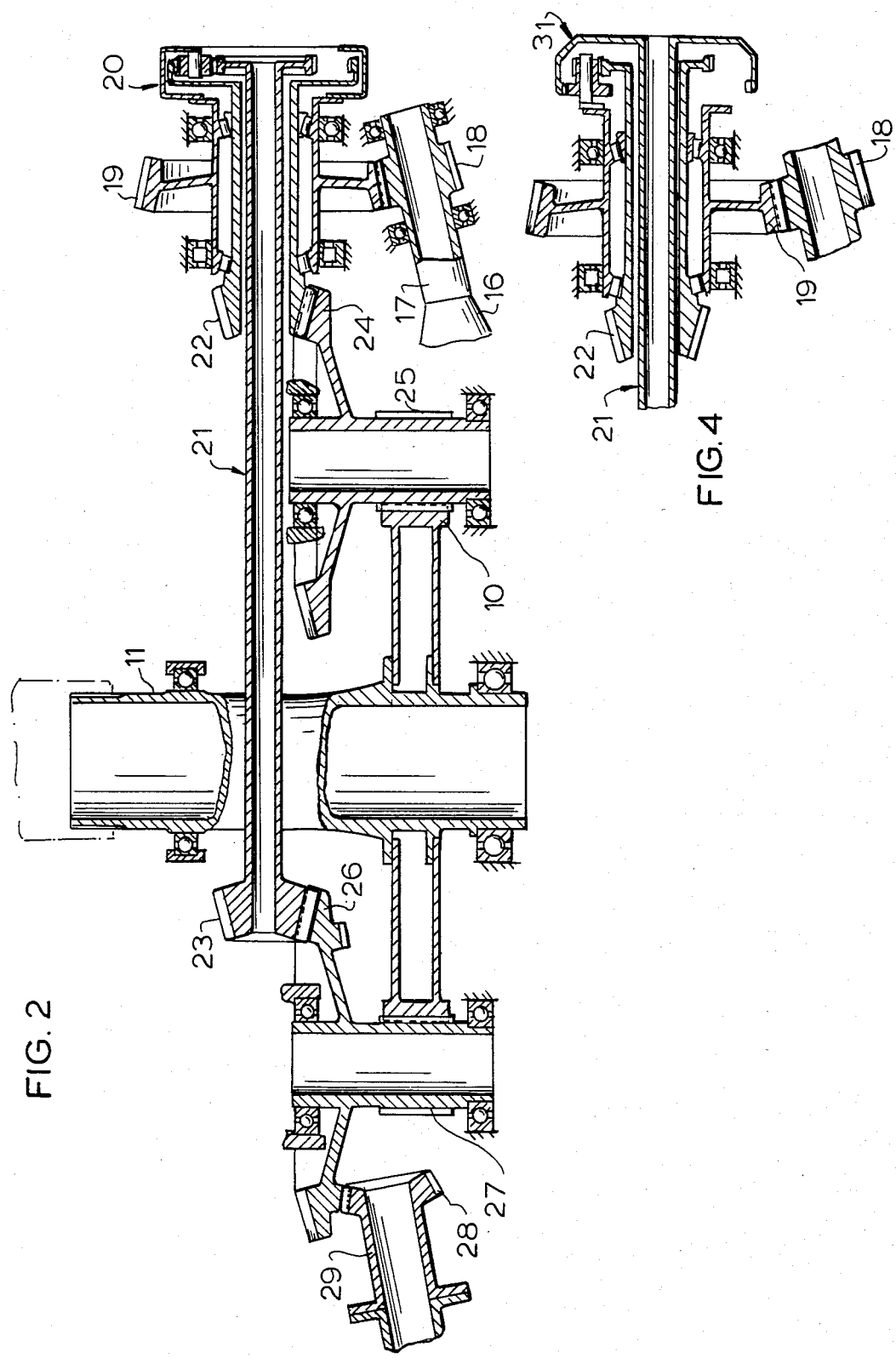

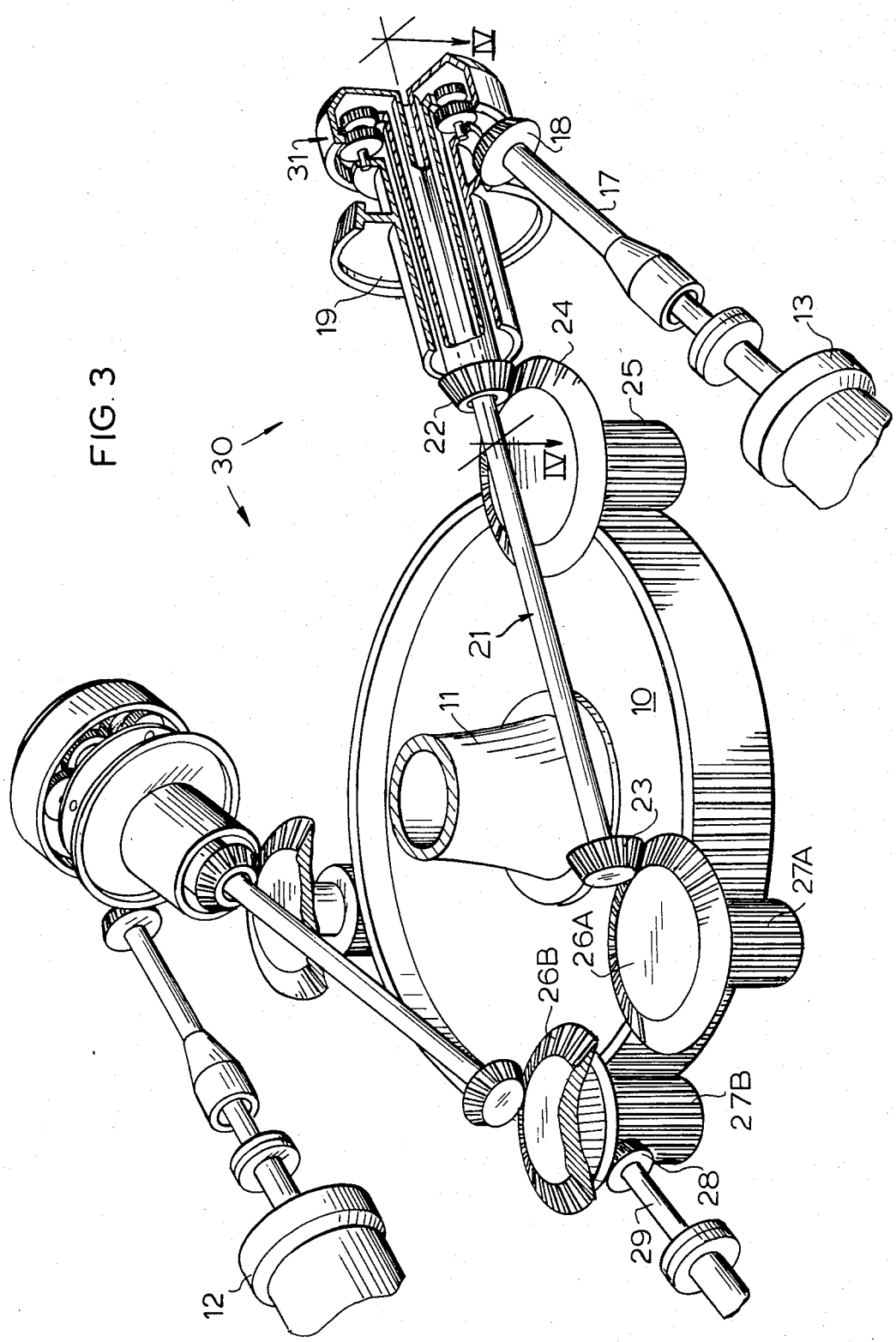

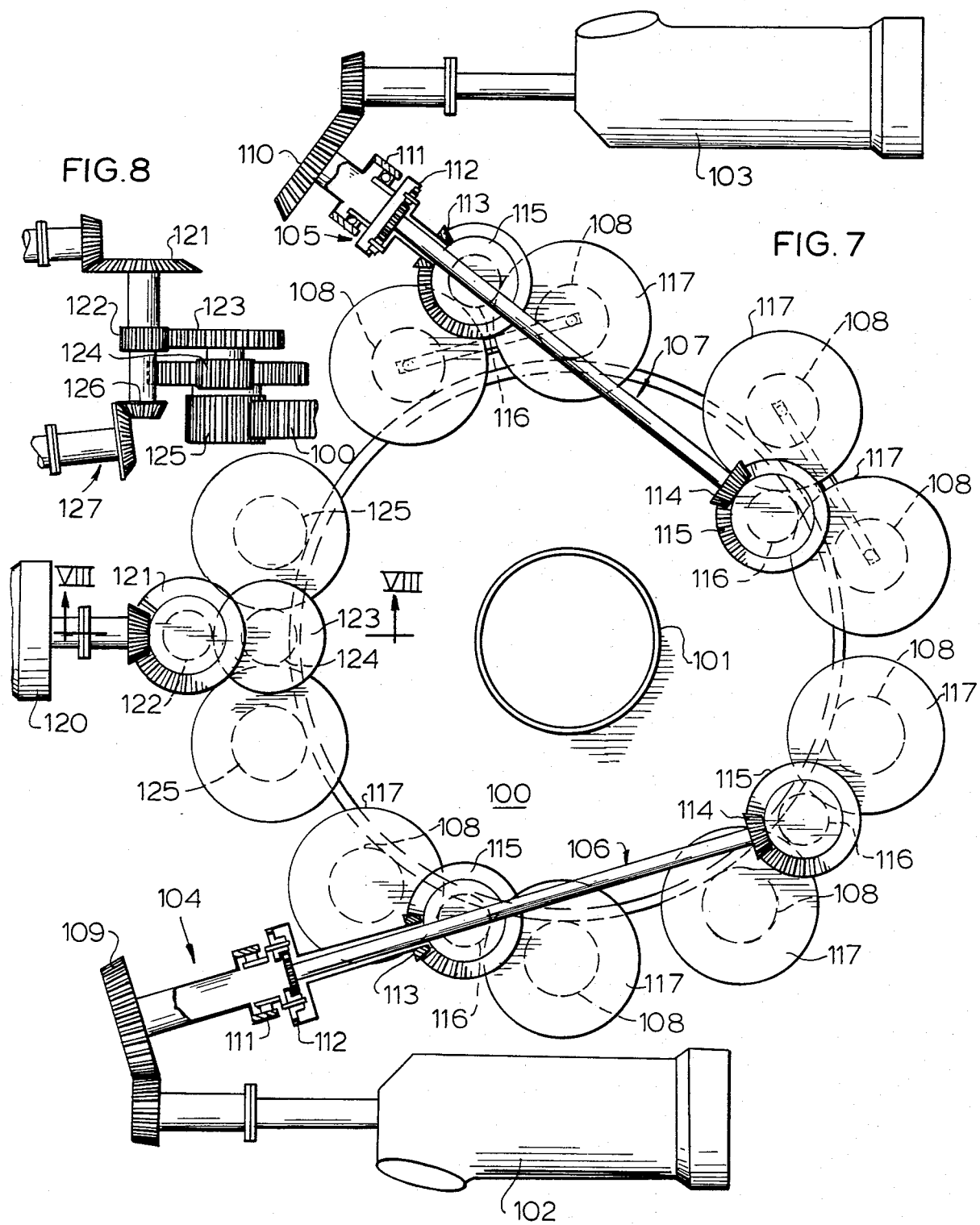

SPLIT TORQUE TRANSMISSION

BACKGROUND OF THE INVENTION

The invention relates to power transmission systems of a type having two or more engine inputs and, more particularly, to split-power transmissions which are arranged to be driven by a high-speed engine, such as a modern turbine engine, and transmit power to a considerably lower speed drive shaft, such as a helicopter rotor drive shaft, wherein the engine power is transmitted through a gear train arrangement incorporating at least one stage in which the power is divided between parallel drive paths.

Conventional power transmissions suitable for use in transmitting power from a high-speed engine to a much slower operating driven mechanism, such as a modern turbine engine driving a helicopter rotor drive shaft, typically utilize four stages of reduction gearing. In order to obtain the required reduction of about 80:1 overall, one of these stages, usually the final stage, comprises a planetary gear arrangement. Planetary arrangements are of high complexity, but predominate in helicopter drive transmissions primarily for the reason that the division of torque between several planet pinions leads to a fairly compact unit at the final stage of the reduction gear. A typical speed ratio up to a value of about 4.7:1 may be achieved in such a planetary gear stage.

A more advantageous helicopter drive transmission is disclosed in U.S. Pat. No. 3,602,068. This patent relates to a split-power transmission in which there are dual-drive paths between the transmission and the helicopter rotor which substantially share equally the load being transmitted from the power source. In a two or more engined installation, the two drive paths from each engine are not combined until the final gear mesh, thus giving drive train redundancy up to this point.

It is also known in the helicopter drive transmission art relating to a plural engined helicopter to provide for at least one pair of parallel-installed engines which are relatively closely laterally spaced and disposed longitudinally aft or forward of the helicopter rotor. Such an arrangement is shown in U.S. Pat. Nos. 3,782,223 and 3,871,248 and Canadian Pat. No. 619,028. Due to the proximity of these helicopter engines with one another, there is considerable risk that a defensive strike to one engine will also destroy or impair the other engine.

It is one of the various objects of the present invention to provide a highly efficient and reliable power drive transmission incorporating gear trains suitable for use in applications requiring a relatively high overall speed reduction, such as in the transmission of power to the main rotor of a helicopter, which is relatively simple in construction and employs a minimum number of reduction stages, gears, and bearings in achieving the overall reduction.

Another object is a helicopter power transmission which allows the engines supplying power to be widely laterally separated and parallel, that is more widely separated than the diameter of the combining gear used to drive the helicopter main rotor.

Another object is to provide a helicopter power transmission in which engine power is divided between parallel drive paths for driving multiple pinions spaced around the rotor combining gear, such that these several pinions are equally loaded. This enables the dimensions of the rotor combining gear to be minimized.

These and other objects and features of the present invention will be apparent from the detailed description of the invention below.

SUMMARY OF THE INVENTION

The invention is directed to a split-torque transmission of the type which may be used to power a helicopter. In this respect, the invention is directed to the use of at least two powering engines with the engine input shafts being drivingly connected to a pair of selectively positioned cross shafts which are laterally angled inward from the longitudinal axes of the respective engines. These cross shafts in turn transmit power to a final drive gear or combining gear which serves to power the main helicopter rotor and tail drive. The inward inclination of these cross shafts permits (1) the engines to be more widely laterally separated than the diameter of the combining gear, (2) the engines to remain parallel, and (3) the engines to be placed alongside or forward of the combining gear.

The engine input shafts are respectively provided with overrunning clutches and have engine bevel pinions which engage with engine reduction bevel gears associated with the cross shafts. In instances where the cross shafts serve to power multiple drive pinions engaged with the combining gear, each engine reduction bevel gear has a planetary gear arrangement associated therewith to form a torque dividing unit. In these instances, each cross shaft is provided with a forward end and remote end split torque bevel pinion respectively separately driven by the ring gear and sun gear of the planetary gear arrangement.

In a first embodiment, the respective forward split torque bevel pinions engage with bevel gears directly associated with the final stage combining gear, these bevel gears having drive pinions fixedly secured thereto for transmitting torque to the combining gear. The remote end bevel pinions of the cross shafts are drivingly engaged with a common further bevel gear having a drive pinion also engaged with the combining gear. A tail drive bevel pinion may be taken off this further bevel gear to power the helicopter tail rotor. A feature of this embodiment of the invention is the provision of purposely arranging the split-torque bevel pinions to receive unequal torques.

In a second embodiment, the respective cross shafts each engage a pair of bevel gears having drive pinions mating with the combining gear. The respective cross shafts each then power a pair of drive pinions and do not cooperate to provide a driving torque to a final common bevel gear. A feature of this embodiment of the invention is that the split-torque bevel pinions of each cross shaft receive identical torque.

In a third embodiment, each of the cross shafts is formed with only a remote end bevel pinion for driving a bevel gear having a helical pinion fixedly secured thereto. The helical pinion meshes with and drives two helical gears, each of which is rigidly fastened to a final drive pinion for transmitting torque to the combining gear. A balance beam arrangement is provided to maintain exact division of torque between the dual helical gears. A feature of this embodiment is the simplified arrangement for providing multiple drive pinions to engage with the combining gear.

In a fourth embodiment of the invention, the cross shafts are again provided with a planetary gear-type torque dividing unit and forward and remote end split torque bevel pinions. These bevel pinions engage with respective bevel gears, each of which has a helical pinion fixedly secured thereto. Each helical pinion, in turn, engages with a pair of helical gears having respective drive pinions fixedly secured thereto for transmitting a torque to the combining gear. The disposition of the remote end helical pinion corresponding with each cross shaft may overlie the combining gear such that a greater inward inclination of the cross shafts is permitted for a wide dispersion of each set of four final drive pinions around the combining gear.

In a final embodiment, appropriate to heavy lift helicopters, a third engine transmission is used such that ten final-drive pinions may engage the combining gear. This embodiment is utilized to illustrate the variability of disposing the cross shaft reduction bevel gears in relation to the combining gear in order to obtain adjustment of the inclination of the cross shafts for dispersing the final drive pinions about the combining gear.

BRIEF DESCRIPTION OF THE DRAWING

FIG. 2 is a cross-sectional view taken along the lines II—II of FIG. 1.

FIG. 3 is a perspective view showing a drive transmission system according to the invention embodied in a twin engine helicopter and having four drive pinions engaging with the combining gear in accordance with a second embodiment.

FIG. 4 is a fragmentary cross-sectional view taken along the lines IV—IV of FIG. 3.

FIG. 7 is a plan view showing a drive transmission system according to the invention embodied in a three engine helicopter and having ten drive pinions engaging with the combining gear according to a fifth embodiment.

FIG. 8 is a fragmentary cross-sectional view taken along the lines VIII—VIII of FIG. 7.

DESCRIPTION OF THE PREFERRED EMBODIMENTS

The embodiments herein disclosed show the split-torque transmission system of the present invention to power a helicopter. The power sources or engines are of a relatively high-speed type, such as modern turbine engines having an output of about 20,000 r.p.m. and generating 1,500 horsepower. The inventive transmission arrangement is arranged to be driven by a high-speed engine and transmit power to a drive shaft which rotates at considerably lower speed, such as a main helicopter rotor which typically rotates at a speed of about 250 r.p.m. The helicopter rotor drive shaft is vertically oriented and the engines are horizontally oriented. Thus, the inventive drive transmission system is capable of producing a very substantial speed reduction, is able to convert horizontal drive to vertical drive, permits the engines to be more widely separated laterally within the helicopter housing while remaining parallel to one another, and achieves this with a simplified construction employing a minimum number of stages, gears, and bearings in achieving the overall reduction.

Figure 1:
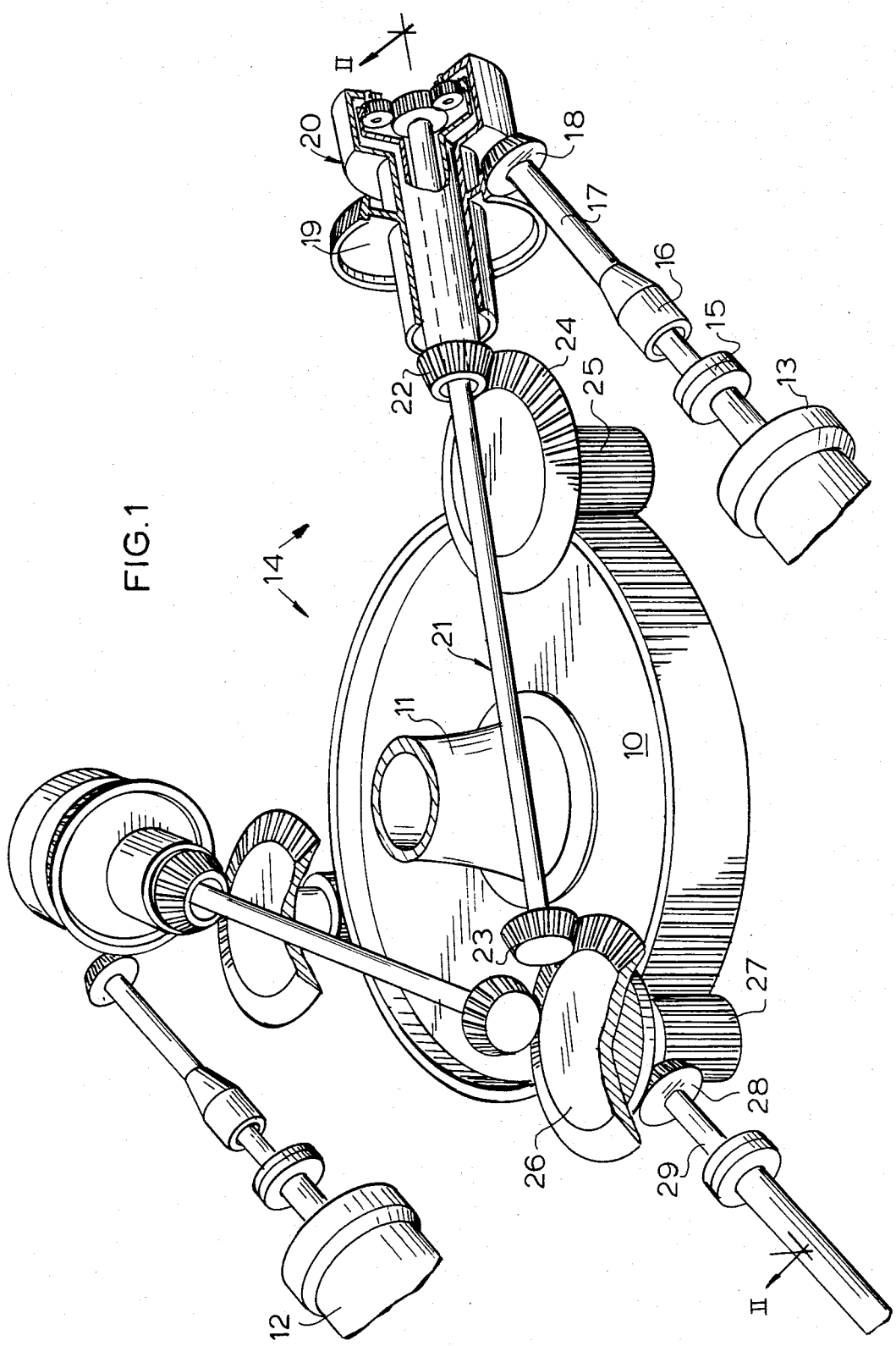
FIG. 1 is a perspective view showing a drive transmission system according to the present invention embodied in a twin engine helicopter having three drive pinions engaging with the combining gear in accordance with a first embodiment.

FIGS. 1 and 2 show a drive or combining gear 10 for rotating a main helicopter rotor 11, the combining gear being disposed about a vertical axis in a helicopter housing. The helicopter rotor 11 is powered from twin helicopter engines 12 and 13 via a split-torque power transmission 14 constructed in accordance with the present invention. Due to the construction and configuration of the drive transmission 14, the engines 12 and 13, which are horizontally oriented and parallel with one another, may be disposed at a relatively wide lateral distance from one another, this distance being about twice the distance from the helicopter rotor 11 than the radius of the combining gear 10.

The drive transmission 14 is made up of two duplicate or mirror image components, such that one need only be described.

Torque from the engine passes first to an input drive flange 15 and through an overrunning clutch 16 to an engine input shaft 17 provided with an engine bevel pinion 18 at its free end. The bevel pinion 18 engages with an engine reduction bevel gear 19 which is connected to a torque dividing unit 20. This torque dividing unit 20 is preferably in the form of a planetary gear arrangement, of known construction, comprising a carrier frame with several planet gears, a central sun gear, and an enclosing internal or ring gear.

Torque from the engine reduction bevel gear 19 is transmitted to the carrier frame of the torque dividing unit 20 for rotation of a dual-drive path cross shaft member 21 having a forward end split-torque bevel pinion 22 and a remote end split-torque bevel pinion 23 as outputs.

The cross shaft members 21 are laterally angled or inclined within the helicopter housing such that the remote ends thereof are disposed more relatively inward toward the helicopter rotor axis. This lateral inclination of the cross shaft 21 permits its associated engine to be disposed more relatively outward laterally away from the combining gear 10 and, accordingly, permits the two engines 12 and 13 to be widely separated from one another within the helicopter housing. This lateral inclination of the cross shaft 21 also enables the associated engine to be disposed longitudinally closer to the helicopter rotor axis such that the helicopter housing may be made more compact in the longitudinal direction.

The ring gear of the torque divider 20 drives the forward end bevel pinion 22, while the sun gear drives through the elongated portion of the cross shaft 21 to the remote end bevel pinion 23. The forward end bevel pinion 22 engages with a reduction bevel gear 24, rotatable about a vertical axis and having a drive pinion 25 fixedly secured thereto for transmitting torque to the combining gear 10. The remote end bevel pinion 23 engages with a further reduction bevel gear 26, rotatable about a vertical axis and having a drive pinion 27 fixedly secured thereto for transmitting torque to the combining gear 10. The further bevel gear 26 is a common gear being engaged for rotation by both remote and bevel pinions of the two cross shafts in the transmission arrangement 14. Additionally, a bevel pinion 28 meshes with an underface of the common bevel gear 26 to furnish torque to a tail drive shaft 29 for the helicopter.

While the torque dividing unit 20 rotates at the speed of the engine reduction bevel gear 19, there is no relative rotation of the gears and bearings inside the unit except for a small angular motion resulting from torsional wind-up of the drive shafts to pinions 22 and 23. Thus, the torque dividing unit 20 contributes no gear tooth losses. Its purpose is to ensure that the two cross shaft bevel pinions which it drives always receive a fixed proportion of the torque supplied from the engine bevel gear 19. The unit 20 maintains this torque balance even though the drive shafts to the bevel pinions 22 and 23 may deflect torsionally. Also, the use of straight spur teeth in the torque dividing unit allow the accommodation of small axial motions caused, for instance, by temperature changes and housing deflections.

The two coaxial bevel pinions 22 and 23 along the axis of each inclined cross shaft may not receive equal torques; however, all of the final drive pinions 25 and 27 associated with the combining gear 10 do carry identical torque.

As an example of the power and torques involved, it is contemplated that each engine 12 and 13 supplies 1,500 horsepower and that the tail rotor drive absorbs 300 horsepower. Then, with two engines, 3,000 horsepower is supplied to the transmission 14 of which 300 is extracted for the tail rotor, leaving 2,700 horsepower available for the helicopter rotor. With three identical final drive pinions, each must carry 900 horsepower. Each forward end split-torque bevel pinion 22 must supply 900 horsepower; however, each remote end split-torque bevel pinion 23 must supply only 600 horsepower. Thus, the two remote end bevel pinions 23 meshing with the further rear reduction bevel gear 26 supply 1,200 horsepower, but 300 horsepower of this is extracted for the tail rotor drive, leaving the required 900 horsepower at the further rear drive pinion 27 which drives the combining gear 10.

Since the coaxial forward and remote end split-torque bevel pinions 22 and 23 of each cross shaft 21 are driven from the torque divider unit and must turn at the same speed, the torques they supply must be proportional to the power carried. With the numbers quoted above, the proportions of the torque divider must be such that the ratio of the diameter of the ring gear to the diameter of the sun gear is 1.5 (900/600). A suitable choice of tooth numbers may then be made for the gearing in the torque divider unit 20 in order than the correct distribution of torque from the engine reduction bevel gear 19 passes to the split-torque bevel pinions 22 and 23. One suitable choice of tooth numbers might be: 80 sun gear teeth, 20 planet pinion teeth, and 120 ring gear teeth.

A feature of the drive transmission arrangement 14 shown in FIGS. 1 and 2 is that the entire transmission drive train from engine inputs to helicopter rotor includes only 17 gears and provides an overall speed reduction of about 100:1. There are, of course, additional gears in the torque divider units 20, however these are not cyclically loaded and are therefore not life dependent.

FIGS. 3 and 4 illustrate a second embodiment 30 of the inventive drive transmission for use in powering a helicopter rotor 11. This alternative transmission 30 results in four final drive pinions engaging with the common gear 10 when two engines 12 and 13 are present. For purposes of clarity, only the structure differing from the embodiment of FIGS. 1 and 2 need be discussed and those elements in common with the first embodiment are indicated by like reference numerals. As with the embodiment of FIGS. 1 and 2, the drive transmission 30 is made up of two duplicate or mirror image mechanisms, such that one need only be described.

Here, the remote end split-torque bevel pinion 23 engages alone with a separate reduction bevel gear 26A, rotatable about a vertical axis and having a respective drive pinion 27A fixedly secured thereto for transmitting torque to the combining gear 10. The bevel pinion 28 for the helicopter tail drive may be disposed to engage with either one of the further reduction bevel gears 26A or 26B.

As with the first embodiment, the engine reduction stage is not of a split-torque type and the engine reduction bevel gear 19 drives into a planetary gear arrangement-type torque dividing unit 31. In this second embodiment arrangement, however, since the two split-torque bevel pinions 22 and 23 on the cross shaft axis each drive a respective single reduction bevel gear 24 and 26A, the two cross shaft bevel pinions must receive the same torque. For this reason, as shown in FIG. 4, the torque dividing unit 31 is proportioned to give a 50/50 division of torque from the engine reduction bevel gear 19. The torque dividing unit 31 is of the same type as shown in FIG. 2, except that a different internal construction, which is known, must be used to obtain the equal division of torque.

As an example of the power and torques involved in connection with this embodiment, the initial engine horsepower and tail rotor drive horsepower numbers will be applied. Considering now the drive train mechanism associated with the engine 13 as shown in FIG. 3, 1,500 horsepower is supplied to the engine reduction bevel gear 19. With a 50/50 torque split in the torque dividing unit 31, each of the two split-torque bevel pinions 22 and 23 on the cross shaft axis carries 750 horsepower. Accordingly, each of the two final drive pinions 25 and 27A transmits 750 horsepower to the combining gear 10. Similarly, the drive train mechanism associated with engine 12 as shown in FIG. 3 transmits 750 horsepower from each of its split-torque bevel pinions on the cross shaft axis. However, because the further reduction bevel gear 26B associated with this drive train mechanism also drives a tail drive bevel pinion 28 from its underface, the final drive pinion 27B associated with this reduction bevel gear carries 750 horsepower less the power of 300 horsepower extracted by the tail drive shaft to the combining gear 10. It follows that with both engines 12 and 13 supplying 1,500 horsepower, three of the final drive pinions carry 750 horsepower to the helicopter rotor 11 and the fourth drive pinion, associated with the tail drive shaft, carries 750 minus 300, i.e. 450, horsepower.

A similar overall speed reduction is obtained with this second embodiment as compared to the transmission 14 of the first embodiment and the entire transmission drive train from engine inputs to helicopter rotor requires only 19 gears. Gears in the torque divider units are additional, but are not cyclically loaded.

It should also be noted that the torque dividing units shown in the figures described above are preferably arranged at the free ends of the cross shafts for easier maintenance access. Also, in order to reduce the number of fatigue life-limited bearings, the forward end split-torque bevel pinions 22 are supported on bearings placed inside the engine reduction bevel gear 19. These bearings for the forward end bevel pinions therefore experience no continuous relative motion across their inner and outer races.

Figure 5:
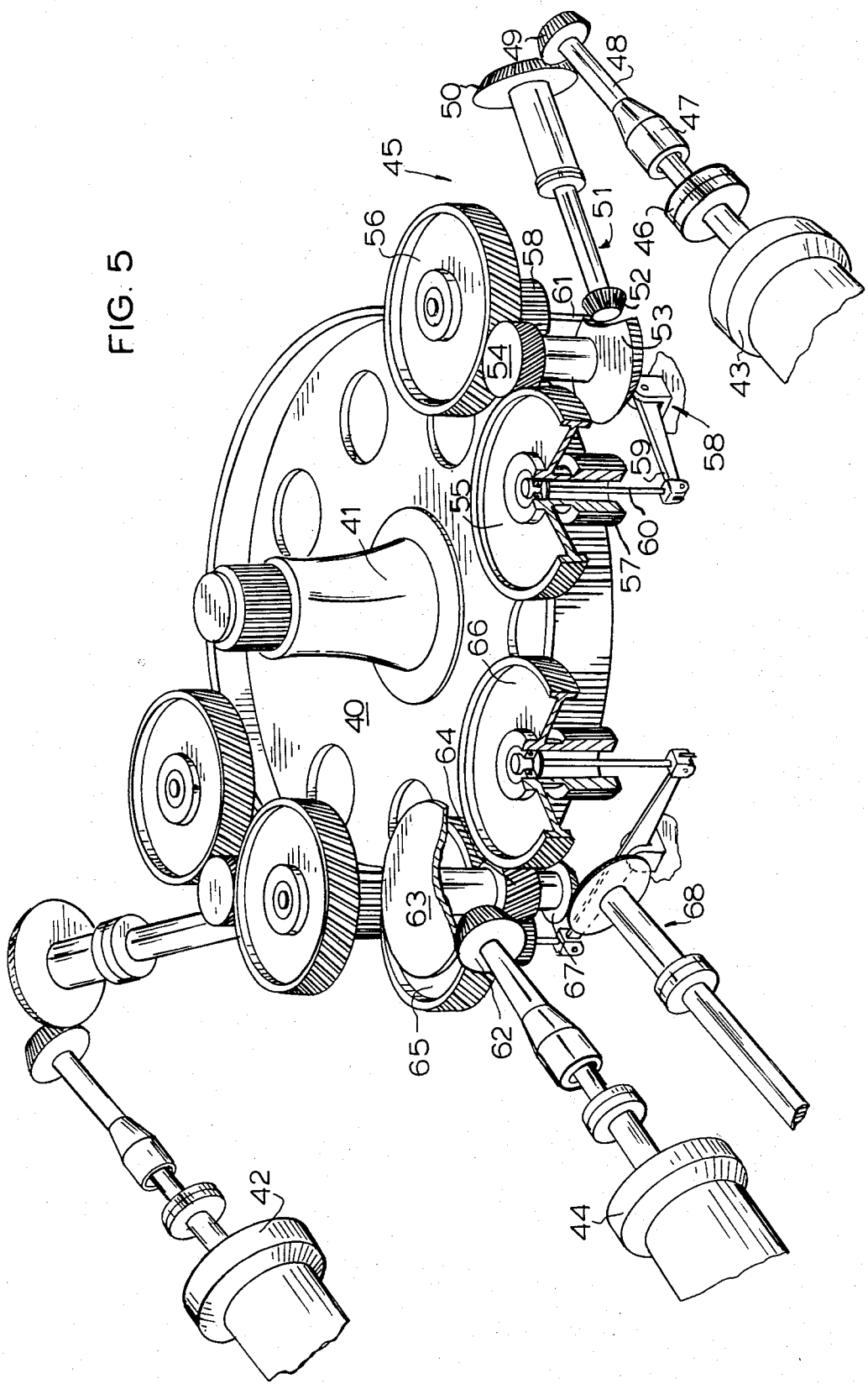
FIG. 5 is a perspective view showing a drive transmission system according to the invention embodied in a three-engine helicopter and having six drive pinions engaging with the combining gear according to a third embodiment.

FIG. 5 shows an alternative way in which two final drive pinions for each helicopter engine can be arranged to drive a helicopter rotor combining gear. As before, a combining gear 40 is disposed for rotation about a vertical axis in the helicopter housing to drive a vertically oriented main rotor shaft 41 secured thereto. Two laterally opposed, horizontally oriented helicopter engines 42 and 43 are disposed in the helicopter housing separated a relatively wide lateral distance from one another. A third, central horizontally oriented helicopter engine 44 may also be provided to additionally provide power to the combining gear 40. Thus, in this arrangement, wherein three helicopter engines are used, the combining gear 40 is driven by six final drive pinions.

A duplicate or mirror image drive transmission 45 extends between each side engine 42 or 43 and the combining gear 40, such that only one such drive transmission need be described.

Torque from the engine 43 passes first to an input drive flange 46 and through an overrunning clutch 47 for rotation of an engine input shaft 48, having disposed at its free end with an engine bevel pinion 49. The engine bevel pinion of 49 engages with an engine reduction bevel gear 50 disposed at the forward end of a laterally inclined cross shaft member 51. The cross shaft 51 is angled laterally inward toward the vertical axis of the rotor shaft 41 in similar manner with the cross shaft arrangements described above, such that any required lateral spacing of the engine 43 from the main rotor shaft 41 can be provided by appropriate positioning of the first stage engine reduction.

Power from the engine reduction bevel gear 50 is passed along the inwardly inclined cross shaft 51 to a remote end bevel pinion 52, which engages with a reduction bevel gear 53. The reduction bevel gear 53 is disposed for rotation about a vertical axis and has a helical pinion 54 fixedly secured thereto. For convenience in reduction of axial thrust loads on the bearings, the helix angle of teeth on the pinion 54 is preferably selected to give an axial thrust which opposes the thrust of the reduction bevel gear 53.

The helical pinion 54 meshes with and drives two reduction helical gears 55 and 56, each of which is disposed for rotation about a vertical axis and has a respective final drive pinion 57 and 58 fixedly secured thereto for transmitting torque to the combining gear 40. In the arrangement shown in FIG. 5, the helical pinion 54 is disposed out of alignment with the helical reduction gears 55 and 56, such that means must be introduced to ensure that each of the two helical meshes and final drive meshes carry identical tooth loads, even when housing distortions under/load cause small displacements of the gear support bearings. In this respect, a balance beam device 58, of known construction, is employed to maintain exact division of torque and power between the two helical gears 55 and 56.

The balance beam device 58 comprises a centrally pivoted main beam 59 pivotedly connected at its outer free ends with two upright pivot beams 60 and 61 respectively connected with the reduction helical gears 55 and 56 through suitable thrust bearings. Any imbalance in tooth loads causes a difference in the axial thrusts on the reduction helical gears 55 and 56, which then move incrementally in opposite directions under the control of the main pivot beam 59. This incremental vertical movement of the helical gears 55 and 56 occurs until the resulting angular adjustments cause the tooth loads in the two helical gears to be equal and, consequently, the tooth loads in the two final drive pinions 57 and 58 to be equal. As a result of this arrangement, the power from each side engine 42 and 43 is divided exactly between the two final drive pinions. In addition to the balance beam device, other known means of equalizing the tooth loads on two or more separate gear trains may also be used. Such other known means include hydraulic pistons and servo-valves, wherein the valves keep constant the axial position of the gears while their axial thrust and hence tangential tooth load is equalized by hydraulic pistons with interconnected fluid chambers.

Torque from the third, central engine 44 is passed to an input engine bevel pinion 62 to mesh directly with an engine direction bevel gear 63 having a helical pinion 64 for driving a pair of helical gears 65 and 66 associated with a gear train and tooth load equalizer arrangement similar to that used for the side engine transmissions 45 for powering the combining gear 40. A further bevel pinion 67 may also be fixedly secured for rotation with the reduction bevel gear 63 to operate the tail rotor drive shaft 68. Assuming the third or central engine 44 supplies 1,500 horsepower and the tail rotor drive demands 400 horsepower, then the remaining 1,100 horsepower is divided between the two helical gears 65 and 66 and their respective final drive pinions.

It should be noted that, while in FIG. 5 the reduction bevel gears 53 are shown to be approximately on line with a diameter of the combining gear 40, these side gears may be moved into other convenient positions such as one where the three sets of dual final drive pinions are spaced equally around the combining gear. This position, except for the modifications arising from extraction of tail rotor power, tends to minimize any net side-load on the main rotor shaft 41 and its support bearings.

Figure 6:
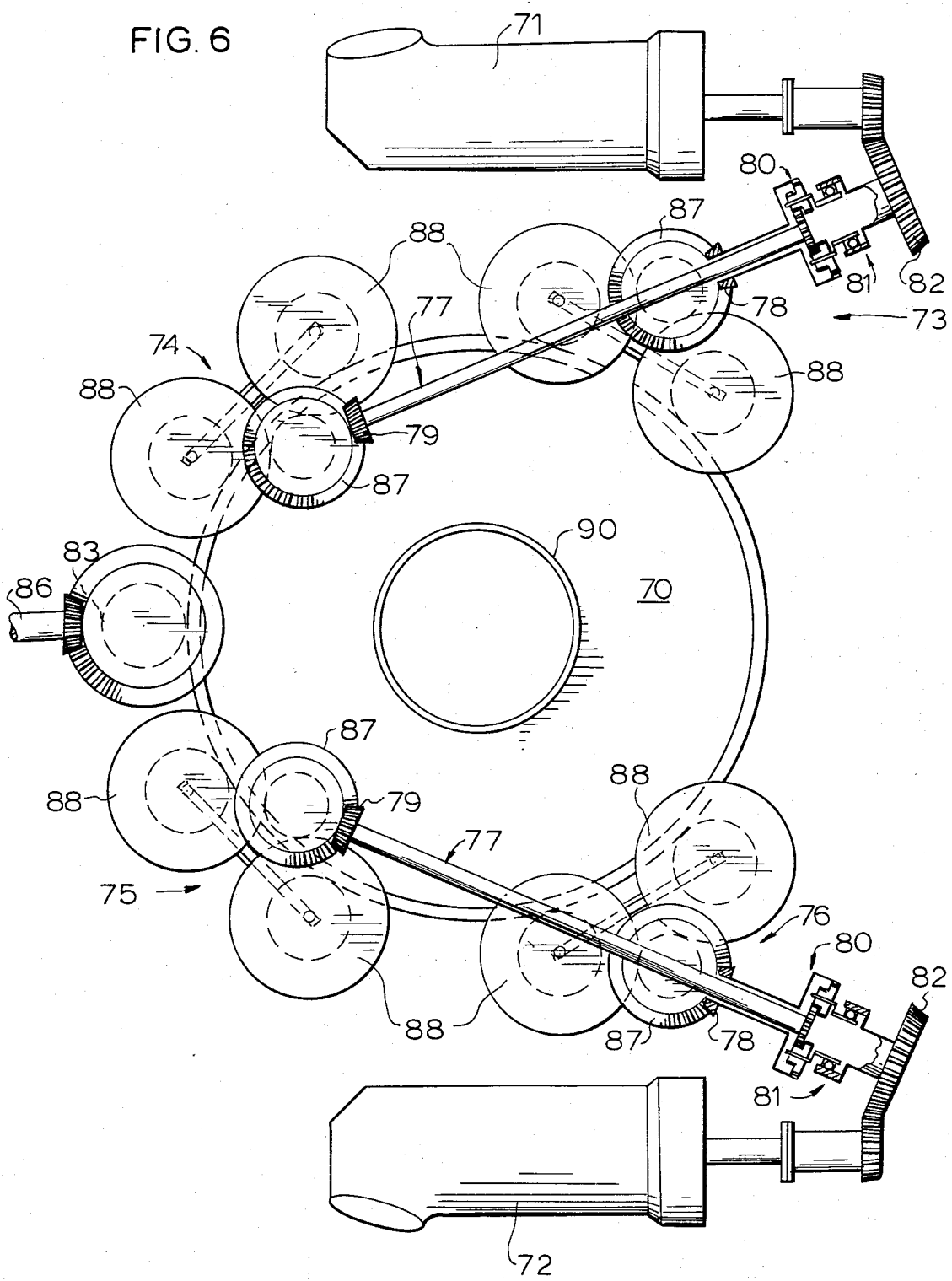
FIG. 6 is a plan view showing a drive transmission according to the invention embodied in a twin engine helicopter and having eight drive pinions engaging with the combining gear according to a fourth embodiment.

FIG. 6 illustrates a still further embodiment of the present invention wherein features from the second and third embodiments are combined with the intent to place four final drive pinions around a helicopter rotor combining gear 70 for each of two twin side-mounted helicopter engines 71 and 72. The combining gear 70 is driven by eight final drive pinions, arranged in dual drive pairs 73-76, in the manner of the FIG. 5 embodiment, and with each engine cross shaft 77 having a forward and remote end output bevel pinion 78 and 79, in the manner of the FIG. 3 embodiment, for respectively powering the dual drives through a helical gear and tooth load equalizer arrangement such as discussed above in connection with FIG. 5. Each set of four final drive pinions in an engine drive line is equally loaded and each engine cross shaft 77 is associated with a suitable torque dividing unit 80, preferably of the planetary gearing type. An overrunning clutch 81 to be associated with each engine drive may be disposed on the engine reduction bevel gears 82.

For tail rotor drive, a ninth pinion 83 is disposed along the longitudinal center line of the drive transmission for meshing with and extracting power from the combining gear 70. This pinion 83 is fixedly secured to a reduction bevel gear 84 which drives a tail rotor bevel pinion 85 connected to the tail rotor drive shaft 86.

The arrangement shown in FIG. 6 is appropriate to heavy-lift helicopters powered by two helicopter engines each rated at, for example, 4,000 horsepower. In this transmission arrangement, second stage reduction bevel gears 87 would each transmit 2,000 horsepower and the final stage drive pinions engaging with the combining gear 70 would each carry only 1,000 horsepower.

The first stage engine reduction bevel gears 82 and the cross shaft drive to the coaxial output bevel pinions 78 and 79 follow the pattern of the FIG. 3 embodiment, where torque from the engine reduction bevel gear 82 is split equally between the two forward and remote end cross shaft bevel pinions 78 and 79. However, where in FIG. 3 the pinion attached to each second stage reduction bevel gear meshes with and drives the combining gear 70, in this FIG. 6 embodiment the second stage reduction bevel gear pinion meshes with and drives two third stage reduction helical gears 88 in the manner described in connection with the FIG. 5 embodiment. The final drive pinions are rigidly attached to the four third stage reduction bevel gears 88 associated with each helicopter engine to mesh with and drive the combining gear 70.

Means are introduced to ensure that each third stage pinion associated with the second stage reduction bevel gears 87 carries one-half of the power from the one engine connected thereto and maintains identical tooth loads on the third stage reduction helical gears 88 and the final drive pinions. This method of torque dividing preferably takes the form of a balance beam device as described above in connection with FIG. 5, although other appropriate known means of equalizing the tooth loads on two or more separate gear trains may be used. On the other hand, if the axes of the third stage pinion and the two third stage reduction helical gears 88 which it drives are arranged to be collinear, then the third stage pinion can be allowed to float freely between the two gears under the action of balanced tooth forces, without requiring a separate torque divider mechanism.

The positioning of the cross shafts 77 as shown in FIG. 6 is intentional to illustrate a preferred manner by which a relatively wide dispersion about the combining gear 70 may be effected for each set of the four final drive pinions associated with one engine. As shown in FIG. 6, the forward second stage reduction bevel gear and its attached pinion is placed outside of a line joining the axes of the final drive pinions associated therewith. The remote end second stage reduction bevel gear and its attached pinion is placed inside a line joining the axes of the adjacent final drive pinions associated therewith. Such positioning of the second stage reduction bevel gears 87 permits a greater inward inclination of the cross shaft 77 from the engine reduction bevel gear 82. If both the second stage reduction bevel gears 87 and their associated pinions were either inside, in line with, or outside a line joining the axes of the two respective adjacent final drive pinions, there would be restriction on the position of the final drive pinions and the lateral inclination of the cross shafts 77 would be reduced.

In comparison with FIG. 3, the introduction of an additional gear stage in FIG. 6 serves to increase the number of final drive pinions acting on the combining gear 70 and also results in a change in direction of rotation between the helicopter engines 71 and 72 and the helicopter rotor 90 fixedly secured to the combining gear 70. If required, however, a change in direction of rotation of the helicopter rotor shaft 90 to bring it back to that of FIG. 3 can be effected by positioning the split-torque bevel pinions 78 and 79 on the opposite side of the second stage reduction bevel gears 87 than that shown. Another option for effecting a change in direction of rotation between the helicopter engines 71 and 72 and the helicopter main rotor shaft 90 would be to place the second stage cross shaft bevel pinions 78 and 79 and associated reduction bevel gears 87 underneath the combining gear 70.

FIGS. 7 and 8 are directed to a final embodiment of the present invention for use in a helicopter in which a three engine power source is used such that the resulting drive transmission has ten final drive pinions driving the helicopter rotor combining gear. This arrangement is appropriate to heavy lift helicopters with the three engines each rated, for example, at 4,000 horsepower or greater.

As before, a combining gear 100 is disposed for rotation about a vertical axis in a helicopter housing having fixedly secured thereto a vertically oriented helicopter main rotor shaft 101. Disposed on opposed lateral sides of the combining gear 100 are two, horizontally oriented helicopter engines 102 and 103, herein shown as being of a rear drive type. Each of the side engines 102 and 103 is respectively associated with a drive transmission 104 and 105 constructed in accordance with the present invention. The drive transmissions 104 and 105 each include a laterally inclined cross shaft drive member 106 and 107, respectively, positioned with remote ends directed laterally inward toward the vertical axis of the helicopter rotor shaft 101 in a manner which, as discussed above, permits the side engines 102 and 103 to be widely separated from one another while at the same time permitting compactness of the helicopter drive transmission in the longitudinal direction.

The final drive pinions 108 engaging with the combining gear 100 and driven by the side engines 102 and 103 are arranged in dual drive pairs in the manner of the transmission arrangement described above in connection with FIG. 6. Also, in the manner of the FIG. 6 embodiment, each of the engine reduction bevel gears 109 and 110 associated with the cross shafts 106 and 107 is provided with an overrunning clutch 111 and a coaxial torque divider arrangement 112, preferably of the planetary gear type. Each of the cross shafts 106 and 107 is formed with a forward end split-torque output bevel pinion 113 and a remote end split-torque output bevel pinion 114 for engaging with a corresponding second stage reduction bevel gear 115, each having a drive pinion 116 fixedly secured thereto for meshing with a pair of third stage reduction gears 117 with which the associated pair of final drive pinions 108 of the dual drive are fixedly secured for transmitting torque to the combining gear 100.

As described above in connection with the FIG. 6 embodiment, torque division between the gears driven by the cross shaft of one engine is equal, such that each of the four final drive pinions 108 in the drive train of a side engine 102 or 103 carries one-quarter of the power supplied by that engine.

With respect to FIGS. 7 and 8, a third central engine 120 is utilized in this transmission arrangement and is disposed along the longitudinal axis of the helicopter housing. The output from the third engine 120 is passed to an engine reduction bevel gear 121 disposed for rotation about a vertical axis. A drive pinion 122 is fixedly secured to the engine reduction bevel gear 121 for meshing with a second stage reduction gear 123 disposed for rotation about a vertical axis and having a drive pinion 124 secured thereto for powering a dual drive arrangement similar to the dual drives powered by the side engines 102 and 103. This dual drive powered by the third engine 120 contains final drive pinions 125 for transmitting torque to the combining gear 100.

A further bevel pinion 126 is fixedly secured to the third engine reduction bevel gear 121 to supply power to the tail rotor drive 127. The two final drive pinions 125 which supply power to the combining gear 100 thus carry the power from the central engine 120 less the tail rotor power.

If required, as discussed above in connection with FIG. 6, an opposite direction of rotation of the helicopter main rotor shaft 101 can be produced by meshing the cross shaft bevel pinions 113 and 114 on the opposite diameter side of the second stage reduction bevel gears 115, or by placing the second stage cross shaft bevel pinions 113 and 114 and reduction gears 115 underneath the combining gear 100 such that the top of the cross shaft bevel pinions 113 and 114 mesh with their mating reduction bevel gears.

The embodiment of FIG. 7 illustrates how the inclination of the cross shafts 106 and 107 can be adjusted by alternate positions of the drive pinions 116 driven by the second stage reduction bevel gears 115. In the lower half of FIG. 7, each of the two second stage reduction bevel gears 115 and attached pinions 116 is on a line joining the axes of the corresponding adjacent final drive pinions 108. When the axis of the drive pinion 116 is collinear with the axes of the two dual drive gears 117 it powers, equal load-sharing between the two meshes and, consequently, the two associated final drive pinions 108 can be effected by allowing the drive pinion 116 to float freely between the two driven gears 117, its driving position set by the balance of two diametrically opposed mesh forces. Therefore, the dual drive arrangements shown in the lower half of FIG. 7 associated with the side engine 102 and also the collinear dual drive arrangement connected with the central engine 120, do not require a separate tooth load equalizer mechanism, such as the balance beam device 58 referred to above.

The upper half of FIG. 7 depicting the drive transmission associated with the side engine 103 illustrates how a steeper lateral inclination of the transmission cross shaft may be effected by placing the second stage reduction bevel gears 115 and attached drive pinions 116 alternately inside and outside a line connecting the axes of the associated sets of dual drive final pinions 108. This steeper inclination of the cross shaft 107 permits the side engine to be placed forward of the main rotor shaft 101. Since, when the drive pinions 116 are not in line with the axes of the corresponding pairs of final drive pinions 108 the final drive pinions 108 cannot float between the gears, a form of torque divider must be used. Consequently, the dual drives associated with the side engine 103 must respectively employ a suitable type of torque divider, such as the balance beam device 58 referred to above, and are preferably formed with helical teeth gears as discussed above in connection with the FIG. 5 embodiment for generating axial thrust to the ends of the main pivot beam.

It is also within the contemplation of the present invention to provide a load measuring cell or a hydraulic servo-piston device beneath the center of the main pivot beam in a balance beam torque divider device in order to detect the axial thrust on the main pivot beam set up by the axial forces generated by the helical gears. Since the helix angle of the dual drive gears is known, the thrust recorded by the load measuring cell can be converted to tangential tooth load and, hence, torque and power transmitted by each pair of final drive pinions engaging with the main helicopter rotor combining gear. With respect to the FIG. 5 embodiment, this sort of reading will give the torque transmitted by each drive train and helicopter engine. With respect to the embodiment of FIG. 7, the sum of two such readings, one from each set of dual drive final pinions, will give the torque supplied from each side engine.

Although various minor modifications may be suggested by those versed in the art, it should be understood that I wish to embody within the scope of the patent warranted hereon all such modifications as reasonably and properly come within the scope of my contribution to the art.

I claim as my invention:

1. in a helicopter having a main rotor drive shaft rotatable about a vertical axis and two parallel-mounted engines for powering said rotor drive shaft, a drive transmission for connecting said engines to said rotor drive shaft such that said engines are variably laterally separated from one another comprising:

respective input shafts driven by said engines, respective cross shafts connected to said input shafts at lead ends thereof and laterally angled relative to the longitudianl axis of said helicopter such that tail ends thereof are closer to said vertical axis than said lead ends, respective drive pinion means powered from the tail ends of said cross shafts, and a combining gear secured to said rotor drive shaft and powered by said drive pinions spaced about the circumference thereof, the tail ends of said cross shafts being able to extend to said respective drive pinion means at various lateral angles for adjustment of the lateral separation of said engines.

2. The drive transmissions of claim 1, wherein said engines are separated from one another across a lateral distance much greater than the diameter of said combining gear.

3. The drive transmissions of claim 2, wherein said engines are disposed laterally from one another across said combining gear.

4. The drive transmission of claim 1, wherein each said drive pinion means comprises a drive pinion between a pair of final drive pinions meshing with said combining gear for powering said final drive pinions, said drive pinion being powered by one respective cross shaft, the axis of said drive pinion being selectively in-line or out-of-line with the axes of said final drive pinions to variably affect the lateral inclination of said one respective cross shaft.

5. The drive transmission of claim 4, wherein said cross shafts extend at differing lateral angles relative to the longitudinal axis of said helicopter.

6. The drive transmission of claim 4, wherein each said cross shaft is formed with first and second longitudinally spaced outputs respectively connected to a torque divider and respectively powering first and second drive pinion means.

7. The drive transmission of claim 6, wherein the axes of the drive pinions of said first and second drive pinion means are each collinear with the axes of their associated final drive pinions.

8. The drive transmission of claim 6, wherein neither of the axes of the drive pinions of said first and second drive pinion means are collinear with the axes of their associated final drive pinions.

9. The drive transmission of claim 8, wherein the axes of the drive pinions of said first and second drive pinions means are on opposite sides of the line formed between the axes of their associated final drive pinions.

10. The drive transmission of claim 4, further comprising a tooth load equalizer means connected between each said pair of final drive pinions in each said drive pinion means when the associated said drive pinion axis is not collinear with the axes of said final drive pinions.

11. A drive transmission, intended primarily for helicopters, disposed between a relatively high speed rotary engine horizontally directed input and a relatively low speed vertically directed rotary drive output comprising a first reduction gear powered by said engine input, a torque divider means connected to said first reduction gear and having first and second torque outputs, a cross shaft powered by said torque divider means and being laterally inclined relative to the axis of rotation of said engine input, said cross shaft having a respective first pinion engaged by said first torque output and a second pinion engaged by said second torque output, a pair of second reduction gears respectively powered by said first and second pinions and receiving equal torques, final drive pinions fixedly secured to said second reduction gears, and a combining reduction gear engaged by said final drive pinions, said combining reduction gear secured to said drive output.

12. The drive transmission of claim 11, wherein a duplicate, mirror image of said drive transmission is disposed between a further relatively high speed rotary engine horizontally directed output and said combining reduction gear.

13. The drive transmission of claim 12, wherein said engines extend in parallel with one another.

14. A split-torque transmission system adapted to connect a substantially horizontally oriented engine to a substantially vertically oriented drive shaft to be driven thereby at a substantially reduced rotary speed comprising:
   a first reduction gear driven by said engine,
   a planetary gear-type torque divider connected to said first reduction gear having first and second unequal torque outputs,
   a cross shaft formed with coaxial first and second drive pinions respectively powered by said first and second torque outputs, said cross shaft being laterally inclined relative to the longitudinal axis of said engine,
   a pair of second reduction gears respectively driven by said first and second pinions and each having a final drive pinion secured thereto, and a third reduction gear secured to said drive shaft and powered by said final drive pinions being spaced thereabout.

15. The split-torque transmission system of claim 14, further comprising another duplicate said transmission adapted to connect a further substantially horizontally oriented engine to said drive shaft, wherein one of said pair of second reduction gears is powered in common by both said second drive pinions of said duplicate transmissions.

16. The split-torque transmission of claim 15, wherein said engines are turbine engines and said drive shaft is a main helicopter rotor drive.

* * * * *